United States Patent [19]

Weil

[11] Patent Number: 4,700,037
[45] Date of Patent: Oct. 13, 1987

[54] MACHINE FOR WELDING ROUNDED BODY BLANKS

[75] Inventor: Wolfgang Weil, Heitersheim, Fed. Rep. of Germany

[73] Assignee: Elpatronic AG, Switzerland

[21] Appl. No.: 820,704

[22] Filed: Jan. 21, 1986

[30] Foreign Application Priority Data

Feb. 1, 1985 [CH] Switzerland ............... 465/85

[51] Int. Cl.⁴ .................................. B23K 11/06
[52] U.S. Cl. .................................. 219/64; 219/61.5; 219/109
[58] Field of Search ............ 219/61.5, 64, 67, 81–82, 219/109

[56] References Cited

U.S. PATENT DOCUMENTS

| 2,013,517 | 9/1935 | Kachel | 219/66 |
| 2,454,948 | 9/1944 | Seltzer | 219/66 |
| 3,117,214 | 1/1964 | Gold | 219/64 |
| 4,144,440 | 3/1979 | Schalch et al. | 219/61.5 |
| 4,332,994 | 6/1982 | Opprecht | 219/64 |
| 4,376,884 | 3/1983 | Gold et al. | 219/109 |
| 4,410,781 | 10/1983 | Riviere | 219/64 |

Primary Examiner—E. A. Goldberg
Assistant Examiner—Catherine M. Sigda

[57] ABSTRACT

The body blanks (10) are moved through, with overlapping longitudinal edges, between an inner and an outer electrode roller (14, 24), the axes (16, 26) of which lie substantially in a common plane (II—II) normal to the direction (A) of the axes of the body blanks (10). Also lying in this plane (II—II) are the axes of a plurality of sizing rollers (34, 36, 38) which are disposed in a ring and one of which (38) is disposed diametrically opposite to the outer electrode roller (24). This sizing roller (38) and a guide roller (42) which is disposed in front of it in the direction (A) of the axes of the body blanks (10) are encircled jointly by an endless conveyor element (46). The guide roller (42) and hence also the conveyor element (46) can be driven by a servomotor (50) which is controlled according to the signals of an angle-of-rotation transmitter (30) rotating with the outer electrode roller (24). The body blanks (10) are pulled forwards by the conveyor element (46) and stabilized in their forward motion as a result.

7 Claims, 3 Drawing Figures

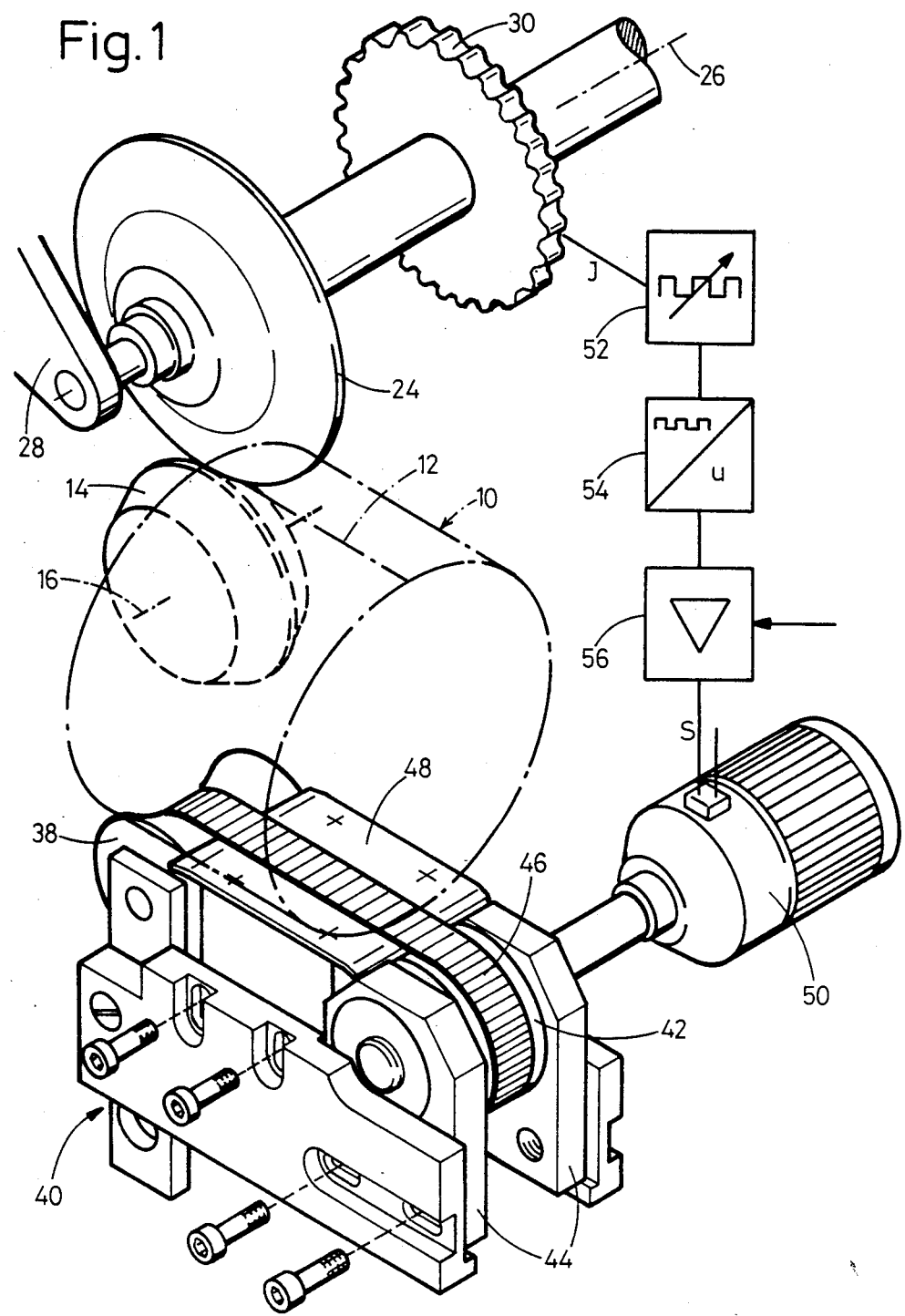

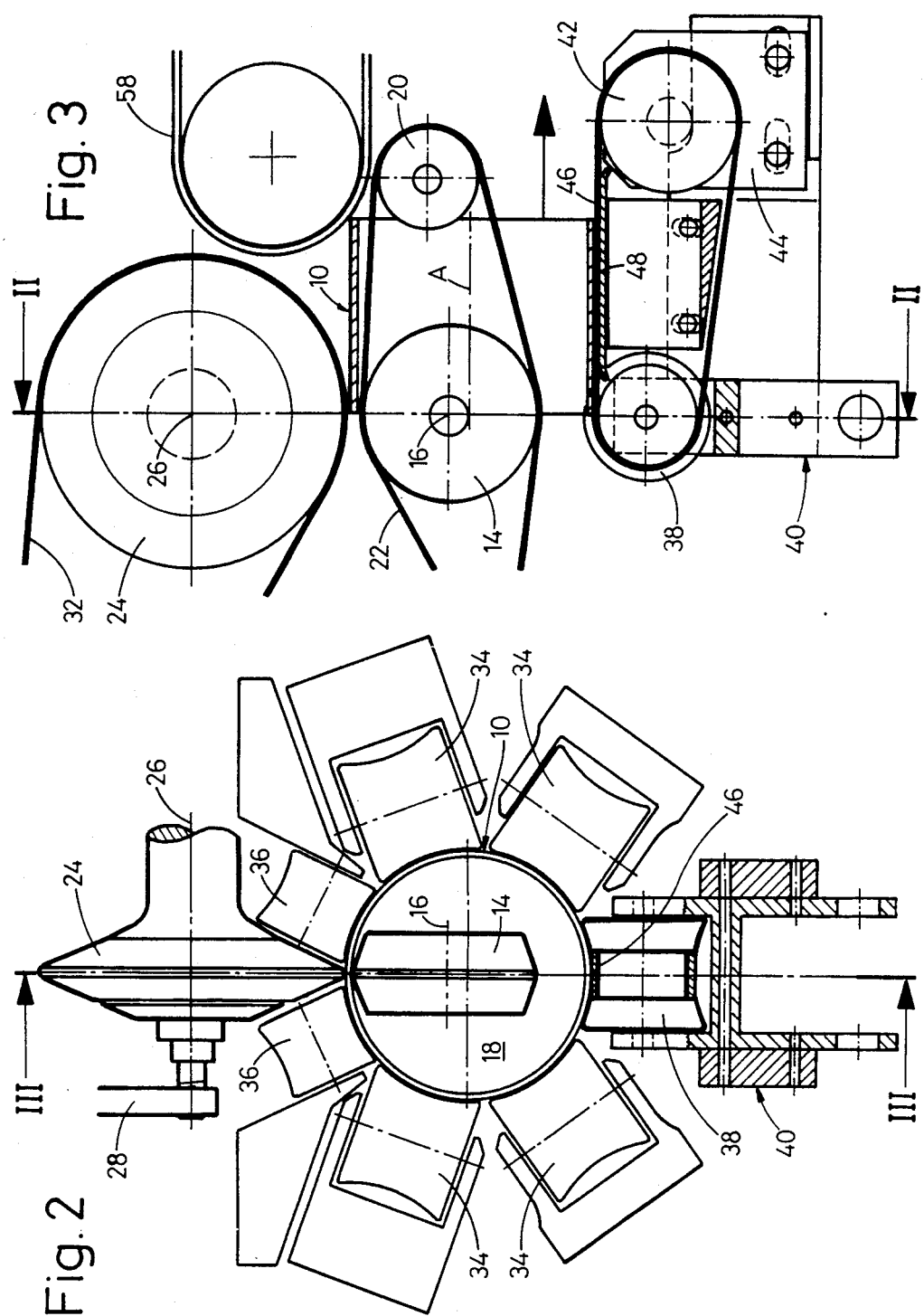

MACHINE FOR WELDING ROUNDED BODY BLANKS

The invention relates to a machine for welding longitudinal seams on rounded sheet-metal container body blanks having
- an inner and an outer electrode roller, the axes of which lie at least approximately in a common plane normal to the direction of the axes of the body blanks,
- a ring of sizing rollers, the axes of which likewise lie at least approximately in the said plane, and
- at least one guide roller which is disposed diametrically opposite to the outer electrode roller with respect to the body blanks and offset forwards in the direction of the axes of the body blanks.

A machine of this type is known from the brochure "Schweissautomaten für Blechgebinde VSS-K-Superwima-Typenreihe" of Soudronic AG, CH-8962 Bergdietikon (Switzerland). There a stationary bracket extends forwards from the ring of sizing rollers. Two diabolo-like rollers are mounted one behind the other on the bracket and resiliently supported radially in relation to the direction of the axes of the body blanks. One of these rolleres belongs to the sizing rollers and is disposed diametrically opposite to the outer electrode roller. The other roller, which is disposed further forwards, is a guide roller and is freely rotatable like the sizing rollers so that it only rotates when it is set in motion by a body blank.

This known machine works satisfactorily if the height of the body blank, measuring in the direction of the axes of the body blanks, is greater than the diameter of the body blank and the welding speed does not exceed 10 to 20 m/min depending on the size of the body blank 10. If the height of the body blank is low in comparison with the diameter of the body blank, however, and/or the welding speed is greater, the body blanks may begin to oscillate which has a disadvantageous effect on the quality of the longitudinal seams. Oscillations of the body blanks in the region of the electrode rollers have proved particularly disadvantageous if the speeds, forces and current intensities occurring during the welding of longitudinal compressed seams are constantly monitored and fed into an automatic regulating device. In such cases, signals which are generated by mechanical oscillations of the body blanks may be superimposed on the measured values and in turn excite oscillations in the regulating device which may lead to faulty regulating states and consequently to defective welding seams. In addition, oscillations of the body blanks may make it more difficult to transfer them to a following conveying or processing device.

Such unwanted oscillations may occur, in particular, if—as in the known machines described at the beginning, wire electrodes are used which are taken round the electrode rollers to prevent these from coming into direct contact with the sheet metal, particularly tin plate, of the body blanks and being contaminated as a result. Experience has shown that the wire electrodes stretch under the action of the high pressures and temperatures during the welding; this elongation of the wire electrodes is generally not precisely equal in magnitude at the two electrode rollers but is usually somewhat greater in the region of the outer electrode roller with the result that moments occur which tend to tilt the body blanks.

It is therefore the object of the invention to develop further a machine of the type described at the beginning, particularly a machine working with wire electrodes for the welding of longitudinal compressed seams, in such a manner that oscillations of the body blanks in the region of the electrode rollers is counteracted more effectively than hitherto and accordingly high welding speeds can be permitted even in the case of body blanks with a comparatively low height.

According to the invention, this problem is solved in that the guide roller can be driven positively in rotation at a circumferential speed which is matched to that of the outer electrode roller.

According to the invention, the guide roller is no longer set in rotation by the body blanks running onto it as hitherto but by a drive which enables it to exert defined entrainment forces on the body blanks and to stabilize their movement as a result.

If, as in the known machines described at the beginning, one of the sizing rollers is disposed diametrically opposite to the outer electrode roller, then a form of embodiment of the invention is particularly advantageous wherein the guide roller is connected to this sizing roller by an endless conveyor element encircling both. The conveyor element may, for example, be an ordinary commercial driving belt or cord drive with one or more round cords or the like.

This form of embodiment of the invention can be further developed in that the conveyor element is supported on a plane platform between the two rollers round which it is wrapped. The platform ensures that the conveyor element bears substantially uniformly against the body blanks over the whole distance between the two rollers round which it is wrapped so as to exert a defined forwardly directed force on these body blanks.

According to a further feature of the invention, a magnet which pulls the body blanks towards the guide roller may be disposed between the ring of sizing rollers and the guide roller. This magnet may be combined with the platform previously described in that the platform itself is magnetizable.

The conveyor element is preferably able to be driven at a speed which deviates by up to 1% upwards or downwards from the circumferential speed of the outer electrode roller. Unwanted tilting moments, which may be exerted on the body blanks by the electrode rollers can generally be completely compensated by differences in speed of this order of magnitude.

Finally, it is an advantage if the guide roller is driven by a servomotor which is controlled according to the signals of an angle-of-rotation transmitter rotating with the outer electrode roller.

One example of an embodiment of the invention is exlained with further details below with reference to diagrammatic drawings.

FIG. 1 shows the welding zone of a machine for producing sheet-metal container bodies, in an oblique view, FIG. 2 shows the corresponding view from the front, partially in section in the vertical transverse plane II—II in FIG. 3;

FIG. 3 shows the side view belonging to FIG. 2, partially in section in the vertical longitudinal plane III—III in FIG. 2.

In FIGS. 1 to 3, only those parts of a machine for producing bodies 10 of sheet metal with a welded longitudinal compressed seam 12 are illustrated in the region of which means according to the invention are provided; the design of such a machine otherwise is known from the brochure mentioned at the beginning as well as from the DE-AS No. 2 532 976 for example; reference is hereby made to these printed documents for further details.

The body blanks 10 are supplied in the rounded state by conveyor means not illustrated; from left to right in FIGS. 1 and 3 and towards the observer in FIG. 2. In FIGS. 1 and 3, such a body blank 10 is illustrated at the moment when its longitudinal seam 12 is completed; it concerns a pressure or mash seam which is produced by electrical resistance welding and which connects two overlapping longitudinal edges of the body blank to one another.

During the welding of the longitudinal seam 12, each individual body blank 10 is pushed over an inner electrode roller 14 which is mounted on a stationary arm 18 for free rotation about an axis 16 which is likewise stationary. The arm 18 projects away from a machine frame, not illustrated, in the usual manner; the bodies are formed in succession by rounding originally plane sheet-metal plates around this arm.

An idler roller 20 is disposed with spacing in front of the inneer electrode roller 14; wrapped round these two rollers is an inner wire electrode 22 which is moved in synchronism with the body blanks 10 in the usual manner.

Associated with the inner electrode roller 14 is an outer electrode roller 24 with a larger diameter, which is mounted on a lever 28 for rotation about an axis 26. The lever 28 can be loaded as usual in such a manner that the outer electrode roller 24 tries to approach the inner electrode roller 14. The outer electrode roller 24 is connected to an angle-of-rotation transmitter 30 and wrapped round by an outer wire electrode 32 which can likewise be moved in synchronism with the body blanks 10. The two wire electrodes 22 and 32 are formed from a common copper wire originally of round cross-section which is rolled flat elsewhere, not illustrated, in the machine and runs in succession over the outer electrode roller 24 and then over the inner electrode roller 14.

The axes 16 and 26 of the two electrode rollers 14 and 24 lie one above the other each in a horizontal plane and are inclined at a very small angle of the order of magnitude of 0.5° in each case with respect to the vertical plane II—II; in the present connection, however, the plane II—II can be designated approximately as the common plane of the two axes 16 and 26.

Disposed at least approximately in the plane II—II is a ring of sizing rollers which consists of two pairs of lateral sizing rollers 34, one pair of upper sizing rollers 56 and one lower sizing roller 38. The axes of all the sizing rollers lie either directly in or with slight spacing parallel to the plane II—II. The lateral sizing rollers 34 are resiliently supported radially with respect to the direction A of the axes of the body blanks 10. The two upper sizing rollers 36 are disposed immediately beside the outer electrode roller 24 and are rigidly mounted. The lower sizing roller 38 is mounted on a bracket 40 which is resiliently supported radially both with respect to the direction A of the axes of the body blanks 10 and with respect to the axes 16 and 26 of the electrode rollers 14 and 24, as likewise known from the said printed documents.

The bracket 40 extends forwards parallel to the direction A of the axes and carries a guide roller 42 which is mounted in a bearing bracket 44 at an adjustable distance from the lower sizing roller 38. All the sizing rollers 34, 36 and 38 as well as the guide roller 42 are diabolo-like in shape.

In addition, the lower sizing roller 38 and the guide roller 42 are centrally grooved and are encircled jointly by an endless conveyor element 46 which, in the example illustrated, is formed by a resilient driving belt. The upper strand of the conveyor element 46 lies on a plane, horizontal platform 48 which is secured for adjustment in height between the lower sizing roller 38 and the guide roller 42. In this manner, the upper arm of the conveyor element 46 is held plane and horizontal between the lower sizing roller 38 and the guide roller 42 in such a manner that it supports each individual body blank 10 along a surface line diametrically opposite to the longitudinal seam 12.

The conveyor element 46 can by driven by a servomotor 50, coupled directly to the guide roller 42, at a speed which coincides more or less precisely with the circumferential speed of the wire electrode 22 running over the outer electrode roller 24, although deviations of 1% upwards or downwards may be advisable in individual cases. The servomotor 50 is regulated in that the angle-of-rotation transmitter 30 delivers signals corresponding to the angular velocity of the outer electrode roller 24 as actual-value signals j, via a frequency analyzer 52 and a frequency/voltage transducer 54, to a comparator 56 which compares these actual-value signals j with desired-value signals S and delivers corresponding output signals to the servomotor 50.

Apart from this, FIG. 3 also indicates how the sheet-metal container bodies 10 are conveyed via a further conveyor system 58 to a processing station not illustrated.

I claim:

1. A machine for welding longitudinal seams (12) on rounded sheet-metal container body blanks (10) having a central longitudinally extending body axis comprising:
   an inner and outer electrode roller (14,24) having axes (16,26) of rotation which lie at least approximately in a common plane (II—II) normal to the central axis of a body blank (10) and engage the body blank during welding of a longitudinal seam along one side of the body blank,
   a ring of sizing rollers (34,36,38), the axes of which likewise lie at least approximately in the said plane (II—II) and
   a guide roller (42) which is disposed adjacent another side of the rounded body blank (10) diametrically opposite said one side engaged by the electrode rollers (14,24) and offset forwardly in the direction of body blank movement with respect to the electrode rollers to guide the blank during welding of a longitudinal seam, characterized by drive means for rotatably driving the guide roller (42) at a circumferential speed which is matched to that of the outer electrode roller (24).

2. A machine as claimed in claim 1, wherein one of the sizing rollers (38) is disposed diametrically opposite to the outer electrode roller (24), characterized in that the guide roller (42) is connected to said one of the sizing rollers (38) by an endless conveyor element (46) encircling both.

3. A machine as claimed in claim 2, characterized in that the conveyor element (46) is supported on a plane platform (48) between the guide and the sizing rollers (38,42) which it encircles.

4. A machine as claimed in claim 1, characterized in that disposed between the ring of sizing rollers (34, 36, 38) and the guide roller (42) is a magnet which pulls the body blanks (10) towards the guide roller (42).

5. A machine as claimed in claim 3, characterized in that the platform (48) itself is magnetizable.

6. A machine as claimed in claim 2, characterized in that the drive means is a variable speed drive means for driving the guide roller and the conveyor element (46) at a speed which deviates by up to 1% upwards and downwards from the circumferential speed of the outer electrode roller (24).

7. A machine as claimed in claim 1, characterized in that the drive means comprises a motor controller including an angle-of-rotation transmitter (30) connected for rotation with the outer electrode roller (24), and a servomotor (50) driven by the controller according to the signals of the angle-of-rotation transmitter (30) rotating with the outer electrode roller (24).

* * * * *